A. H. EMERY & J. JOHNSON.
Improvement in Barometers.
No. 127,752. Patented June 11, 1872.
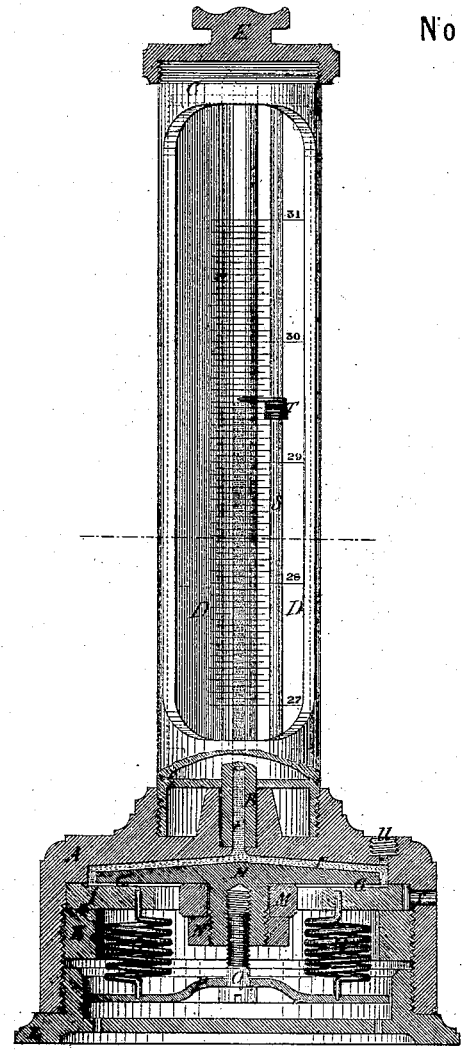
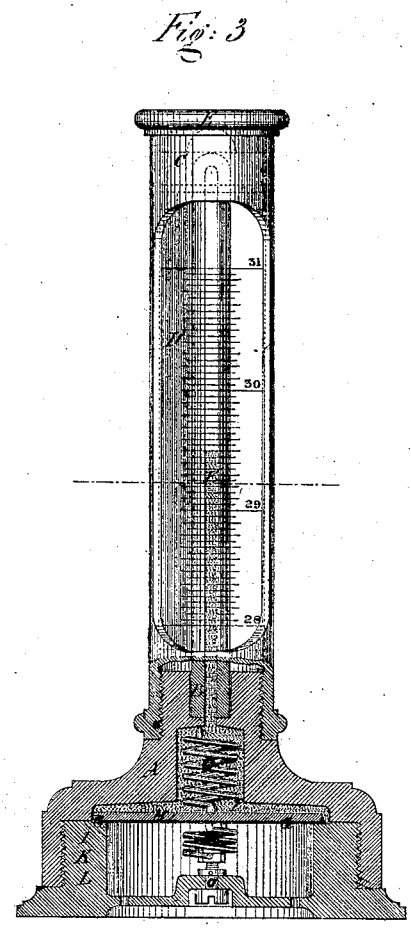
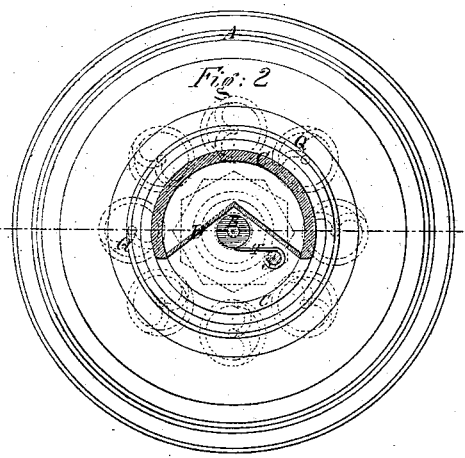
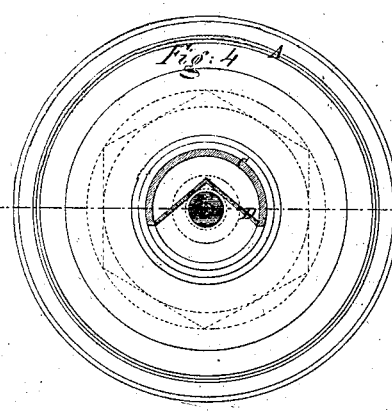

127,752

UNITED STATES PATENT OFFICE.

ALBERT H. EMERY, OF NEW YORK, N. Y., AND JOHN JOHNSON, OF SACO, ME.

IMPROVEMENT IN BAROMETERS.

Specification forming part of Letters Patent No. 127,752, dated June 11, 1872.

SPECIFICATION.

*To all whom it may concern:*

Be it known that we, A. H. EMERY, of the city, county, and State of New York, and JOHN JOHNSON, of Saco, in the county of York, in the State of Maine, have invented a new and Improved Barometer; and we do hereby declare that the following is a full and exact description thereof, reference being had to the accompanying drawing and to the letters of reference marked thereon.

The nature of our invention consists in making a mercurial barometer which has a short column of mercury only, and yet shows accurately the atmospheric changes of pressure, the pressure of the atmosphere being always balanced by a spring which gives a constant pressure and by a mercurial column which has its length or height regulated by the atmospheric pressure which is being measured.

To enable others skilled in the art to make use of our invention, we will proceed to give the precise construction and operation.

In the drawing, Figures 1 and 2 show an elevation and plan of the barometer complete, each being shown partially in section. Figs. 3 and 4 show another barometer on the same principle in a simpler and somewhat modified form, where Fig. 3 is the elevation and Fig. 4 the plan, each being shown partially in section.

A represents a chambered piece of suitable material, which, by preference, we make of iron. Into A is connected the glass vacuum-tube B, in which the mercury rises and falls. C is a tube screwed or soldered to A for the purpose of holding the scale D and protecting the glass tube B. E is a cap to the tube C. F is a chamber in the pieces A and B, which chamber is partially filled with mercury, the balance of the chamber being empty so the mercury shall be free to rise therein. G is a thin diaphragm of fine iron, or paper, vellum, gold-beater's skin, or other suitable material, which is firmly connected to the plate H, which may well be made of iron. The diaphragm G may be firmly held to the plate H, at its center, by the washer M and nut N. The diaphragm G, if made of sheet-iron, should be very thin; if made of paper, the paper should be made air-tight by a coating of albumen or gelatine or other suitable material. The diaphragm G, if made of paper, gold-beater's skin, or other very flexible material, may be strengthened by cementing it to a very thin copper or other metal plate. After the diaphragm G has been fastened to the plate H by cement, glue, or its sizing, it is then fastened to the piece A by means of cement, the washer I, and screw K. L is the base of the instrument screwed to the chambered piece A. In Figs. 3 and 4 the parts I, K, and L are all made of one piece. It is necessary that the diaphragm G be made of material that will not be acted upon by mercury on the side next the mercury, that it be very thin and flexible, that it is air-tight, and that the joints between it and the pieces H and A be also air-tight. Owing to the vacuum in the chamber F, the air will press heavily upon the plate H and diaphragm G, to raise them, but this pressure will be resisted by the pressure of the mercury on the opposite side. To balance this pressure of the air by the mercury-pressure alone would take a column of mercury from twenty-seven to thirty-one inches in height usually; but this height would be very inconvenient, and, to avoid this great length of the column of mercury, we place (in Fig. 1) the springs Q in such a way that they shall oppose the atmospheric pressure, and make them bear usually from six-sevenths to seven-eighths of it, leaving the mercury column to bear the rest. The pressure of the springs Q is transmitted to the plate H by the plate P and screw O. By turning O we may make the springs Q carry such an amount of pressure as we like, compressing the springs if we wish more and elongating them if we wish less pressure on them. In Figs. 3 and 4 the springs R and Q take the place of the springs Q in Figs. 1 and 2, the adjustment to bring the mercury to any height desired, to increase or decrease its pressure being made in the same way as in the other, by turning the screw O. S, in Figs. 1 and 2, is a slide-rest for the index T, which is used to mark the height of the mercury at any time. U is a screw, and through the hole in which it is placed we may fill the chamber F; or it may be filled through the top of the glass tube B before it is sealed up by melting together the upper end of the same. V is a small pin, the head of which keeps the washer I from turning around when K is being turned to its seat. The instrument being properly adjusted and set in a vertical position, as shown, will show the actual changes in the atmospheric pressure, for as the air-pressure decreases the mercury column must fall, until its pressure and that of the springs are together equal that of the air, and when the air-pressure is increased the column of mercury will rise in the tube B until its pressure and that of the springs are equal to the air-pressure. In order that this instrument shall be very perfect, we make the inside of the tube B very small compared to the size of the diaphragm G, so that the latter will be moved but a very little, to move the mercury from the bottom to the top of the tube B. We also make the diaphragm G very thin, so it will move very easily, and make the springs Q and R of very considerable range, so that the slight distance the diaphragm G moves will not sensibly change the strain on them. With the proportions shown in Figs. 1 and 2 the diaphragm G will only be moved about one-thousandth of an inch in raising the mercury column about one inch, which shows a difference of atmospheric pressure of about one-half pound per square inch.

Having thus described our invention, what we claim, and desire to secure by Letters Patent, is—

1. The construction and use of the sealed vacuum and liquid chamber made of the parts B, A, and G, wherever they are arranged and used substantially as herein described and set forth.

2. The combination and arrangement of the flexible diaphragm G, plate H, springs Q, and adjusting-screw O, substantially as and for the purposes set forth.

A. H. EMERY.
JOHN JOHNSON.

Witnesses:
LOUIS KOLBER,
HUGO LILLIEHÖÖK.